United States Patent [19]

Iijima et al.

[11] 4,360,382

[45] Nov. 23, 1982

[54] METHOD FOR MANUFACTURING EXTREMELY THIN MAGNETIC PLATES FOR MULTILAYER-TYPE HEAD CORES

[75] Inventors: Kenzaburo Iijima; Kazuo Kurahashi; Toshiharu Hoshi, all of Hamamatsu, Japan

[73] Assignee: Nippon Gakki Seizo Kabushiki Kaisha, Japan

[21] Appl. No.: 65,345

[22] Filed: Aug. 9, 1979

[30] Foreign Application Priority Data

Aug. 11, 1978 [JP] Japan ................................ 53-97841

[51] Int. Cl.³ ............................................... B22F 3/00
[52] U.S. Cl. .................................. 75/200; 75/208 R; 148/104; 148/105
[58] Field of Search .................. 148/104, 105; 75/200, 75/208 R

[56] References Cited

U.S. PATENT DOCUMENTS

| 2,158,132 | 5/1939 | Legg | 148/104 |
| 2,221,983 | 11/1940 | Mayer et al. | 75/208 R |
| 2,655,716 | 10/1953 | Marinis | 75/208 R |
| 2,830,358 | 4/1958 | Millen | 75/208 R |
| 2,992,474 | 7/1961 | Adams et al. | 148/104 |

Primary Examiner—Brooks H. Hunt
Attorney, Agent, or Firm—Ostrolenk, Faber, Gerb & Soffen

[57] ABSTRACT

A number of extremely thin magnetic plates advantageously used for head cores are formed at one time by subsequent application of pressing, sintering, peripheral cutting and separating to a green multilayer construction which includes alternately superimposed metallic powder and parting agent layers, the former resulting in the magnetic plates. High yield is obtained with trouble-free process while making the best use of hard-to-work materials such as Fe-Al-Si type alloys which in general have excellent magnetic properties.

20 Claims, 14 Drawing Figures

METHOD FOR MANUFACTURING EXTREMELY THIN MAGNETIC PLATES FOR MULTILAYER-TYPE HEAD CORES

BACKGROUND OF THE INVENTION

The present invention relates to an improved method for manufacturing extremely thin magnetic plates for multilayer-type head core, and more particularly relates to improvement in the mass-production of extremely thin magnetic plates for multilayer-type head cores which are advantageously used for magnetic sound recording, reproducing, magnetic video recording and reproducing.

Such alloys as sendust alloys and alperm alloys have been used as a material for magnetic head cores because of their excellent magnetic properties, appreciable hardness and high abrasion resistance. However, such materials have a serious drawback that their high conductivity results in large eddy current loss in the high frequency range and, consequently, low effective permeability when used for magnetic head cores.

In order to avoid this trouble, it has been proposed to assemble a plurality of thin magnetic plates by means of electrically insulating resins. The head core so formed has a multilayer construction in which thin magnetic plates and thin insulating layers are alternately superimposed.

The thin magnetic plates used for this purpose are in general manufactured by applying suitable machining to cast blocks. Such a conventional process for preparation of the thin magnetic plates is accompanied by serious problems as follows.

The first problem is caused by the great hardness of the sendust alloys and alperm alloys. In preparation of the thin magnetic plates, cutting is applied to the cast block so that its shape should follow that of the end product, i.e. the head core. After this cutting, the shaped cast block has to be sliced into a number of thin plates by using a suitable mechanical device such as a wire saw. This slicing process is very time-consuming due to the hard-to-work nature of these alloys.

The second problem is caused by the slicing process itself. Since the slicing is carried out by using a wire saw or the like, the portions of the cast block corresponding to the thickness of the saw have to be consumed as chips. This waste causes innegligible lowering in the yield of production.

SUMMARY OF THE INVENTION

It is the primary object of the present invention to make the best use of the alloys in the production of multilayer type head cores.

It is another object of the present invention to provide a novel method for manufacturing extremely thin magnetic plates for multilayer-type head cores with remarkably reduced operation time, simplicity in operation, and appreciably high production yield.

In accordance with the present invention, a pressed multilayer construction is first prepared, which includes alternately superimposed layers of a hard-to-work metal powder and of a parting agent. All or a part of the layers may be subjected to preparatory compression. After application of subsequent sintering and peripheral cutting, the resultant multilayer product is divided into extremely thin magnetic plates by suitable mechanical separation.

PREFERRED EMBODIMENTS OF THE INVENTION

Any kind of magnetic material can be used for the present invention as long as same can be manufactured by the powder metallurgy. Alloys such as Fe-Si-Al alloys, i.e. the so-called sendust alloys, permalloy alloys and alperm alloys, are usable for the present invention. However, the present invention is most advantageously applied to head cores of hard-to-work magnetic materials such as sendust and alperm alloy materials. Herein, the term "hard-to-work magnetic materials" means the magnetic materials which are relatively easly subjected to hot working but are not relatively easily subjected to cold working.

Here, the sendust alloy refers to a magnetic alloy which contains one or more components chosen from the following group at a total content ratio of 0.001 to 8.0% weight;

Nb 0.01 to 6.0% by weight
Mo 0.1 to 5.0% by weight
Ti 0.1 to 5.0% by weight
Cr 0.1 to 7.0% by weight
V 0.1 to 5.0% by weight
Ni 0.1 to 7.0% by weight
Cu 0.05 to 6.0% by weight
W 0.1 to 5.0% by weight
Ta 0.1 to 5.0% by weight
Ge 0.1 to 5.0% by weight
Hf 0.1 to 5.0% by weight
Zr 0.1 to 5.0% by weight
Rare earth elements 0.01 to 3.0% by weight
Mn 0.1 to 5.0% by weight
P 0.001 to 0.5% by weight
Y 0.01 to 5.0% by weight
B 0.001 to 0.5% by weight
Ti 0.1 to 5.0% by weight
Pb 0.1 to 5.0% by weight The alloy further contains 3 to 8% by weight of Al, 3 to 12% by weight of Si, and the remainder of Fe. The alperm alloy consists of 16 percent by weight of Al and the balance of Fe. These alloys are known as magnetic materials having high initial permeability, high maximum permeability, high hardness and excellent abrasion resistance. These alloy materials are prepared in the form of metallic powder used.

The parting agent is chosen from materials which neither melt nor produce gases at the sintering temperatures of the metallic powders of the magnetic materials. In other words, the materials for the parting agent are required to be sufficiently heat-resistant at the sintering temperatures of the above-described metallic powder, so that the sintered parting agent will hold the layers of metal together, until the final separation step of the process, sufficiently strongly to permit the multilayer sintered assembly to be machined, and especially to be peripherally fine-cut (see below), as a unit. It is also required that the materials should not disperse into the metallic powders at the above-described sintering temperatures, so that the parting agent layers remain between adjacent metallic layers after sintering until the separation step. Oxide powders such as alumina powder, magnesia powder and silica glass powder may be used. Aluminium foil with surface oxidation (or alumite) can be advantageously be used for this purpose also.

These materials have no harmful effect on the magnetic properties of the metallic laminae, which may retain small amounts of the partying agent thereon even after the separation step.

Figure 1:
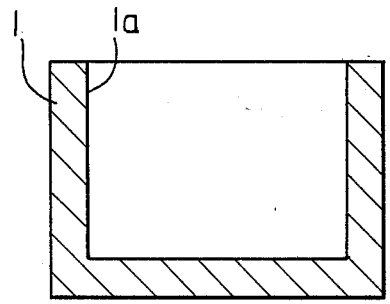
FIG. 1 is a side sectional view of a metallic mold usuable for the process in accordance with the present invention.

In order to form a magnetic thin plate for multilayer-type head cores in accordance with the present invention, a metallic mold 1 such as shown in FIG. 1 is used, which is open in top and provided with a cavity 1a patterned after the head core to be manufactured.

Figure 2A:
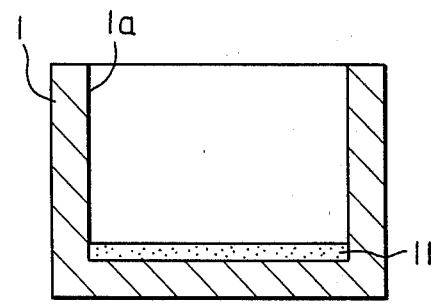
FIGS. 2A to 2C are side sectional views for showing subsequent steps of an embodiment of the process in accordance with the present invention.

The process starts with introducing magnetic metallic material powder in the mold cavity 1a to a prescribed depth in order to form the first metallic powder layer 11 as shown in FIG. 2A.

Figure 2B:
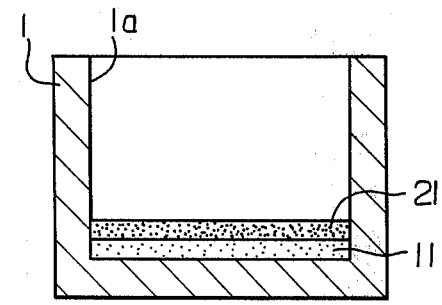

Next, parting agent powder or foil is introduced in the mold cavity 1a in order to form a first parting agent powder layer 21 on the first metallic powder layer 11 as shown in FIG. 2B.

Figure 2C:
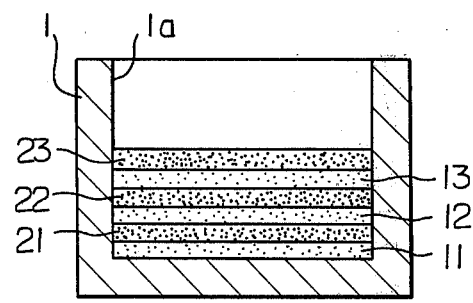

By alternately introducing the metallic powder and parting agent a green multilayer construction such as shown in FIG. 2C is obtained, which is made up of a number of alternately superimposed metallic powder layers 11, 12, 13 and parting agent layers 21, 22, 23. Although the green mutlilayer construction in the illustrated embodiment includes alternate six powder layers, the number of the layers can be freely chosen in accordance with the required function of the final product, i.e. the head core.

Figure 3:
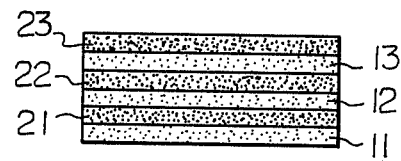
FIG. 3 is a sectional side view of a pressed multilayer construction prepared by the process shown in FIGS. 2A to 2C, FIGS. 4A to 4C are side sectional views for showing subsequent steps of another embodiment of the process in accordance with the present invention.

After the above-described alternate introduction of the metallic powder and parting agent is complete, suitable press such as the known hydrostatic press is applied to the green multilayer construction within the mold 1 in order to obtain a pressed or compact unitary multilayer construction such as shown in FIG. 3, which includes, in a pressed state, three metallic powder layers 11, 12, 13 and three parting layers 21, 22, 23.

Thereafter, the pressed multilayer construction is subjected to suitable sintering in order to obtain a multilayer product. When required, suitable fine cutting is applied to the peripheral section of the sintered multilayer construction in order to provide the thin plate with a smooth surface texture. The cutting is carried out to the depth of 0.1 mm or less. The obtained multilayer product includes alternately superimposed three metallic layers and three parting agent layers. This multilayer unit is then separated along the parting layers, preferably by cutting, into individual metallic plates. In the embodiment shown in FIGS. 2A–2C and 3, three extremely thin, magnetic, metallic plates are obtained. A suitable number of such plates are then stacked together in known fashion to form a multilayer type head core.

In order to avoid difficulty in fine cutting the multilayer product manufactured in the process shown in FIGS. 2A to 2C, it is advisable to form an additional cylindrical metallic layer in the peripheral section of an multilayer product which runs perpendicularly to the superimposed alternate metallic and parting agent layers in order to connect the alternate metallic layers.

Such a modified process of the present invention will hereinafter be explained in more detail in reference to FIGS. 4A to 4C.

The metallic mold 1 used in the foregoing embodiment is usable for this embodiment also.

Figure 4A:
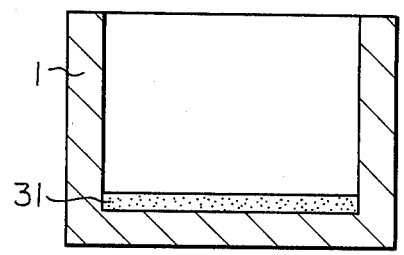

Like the foregoing embodiment, metallic powder is introduced in the mold cavity 1a to a prescribed depth in order to form the first metallic powder layer 31 as shown in FIG. 4A. Next, an annular mask 5 is placed on the first metallic powder layer 31. After setting of the annular mask 5, parting agent powder is introduced in the center bore of the annular mask 5 to a depth equal to the thickness of the annular mask 5 as shown in FIG. 4B. Consequently, the contour of the first parting agent powder layer 41 is same with that of the center bore of the annular mask 5, the thickness of the first parting agent powder layer 41 is equal to that of the annular mask 5, and the contour of the substantially annular mask 5 is substantially same as that of the mold cavity 1a.

By removal of the annular mask 5, an annular space is left around the first parting agent powder layer 41 on the first metallic powder layer 31. The metallic powder is again introduced in the mold cavity 1a to a prescribed depth in order to form the second metallic powder layer 32. The metallic powder is further introduced so as to fill the annular space around the first parting agent powder layer 41. Thus, the first and second metallic powder layers 31 and 32 are connected in one body to each other by a cylindrical metallic powder section 6a as shown in FIG. 4C, which closely surrounds the first parting agent powder layer 31.

Figure 5:
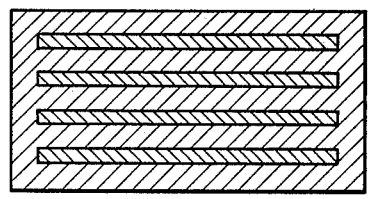
FIG. 5 is a sectional side view of a sintered multilayer construction prepared by the process shown in FIGS. 4A to 4C, FIGS. 6A to 6C are side sectional views for showing subsequent steps of the other embodiment of the process in accordance with the present invention.

By repeating the above-described process, a green multilayer construction is obtained in the metallic mold 1. After application of press and sintering to the green multilayer construction, a compacted multilayer product such as shown in FIG. 5 is obtained. This multilayer product includes alternately superimposed metallic and parting agent layers and a cylindrical metallic layer 6 which connected alternate metallic layers in one body with each other. Obviously, the cylindrical metallic layer 6 is made up of the sintered cylindrical metallic powdered sections 6a each of which closely surrounds the associated parting agent layer. In this case, cutting is applied to the cylindrical metallic layer 6 to the depth from 0.1 to 0.5 mm. in order to smooth the peripheral surface of the thin plate to be obtained.

Figure 6A:
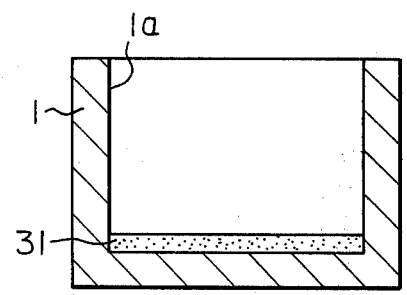
Figure 6B:
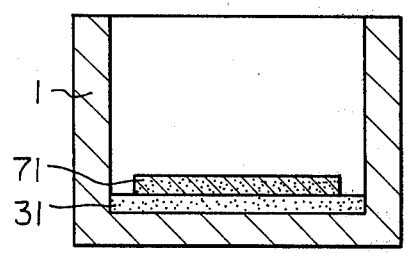
Figure 6C:
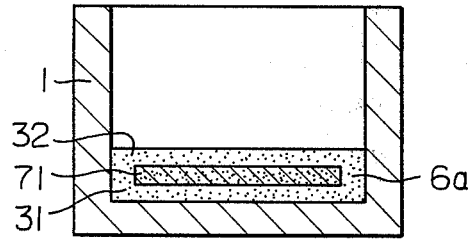

Another modified embodiment of the process in accordance with the present invention is shown in FIGS. 6A to 6C, in which parting agent powder layers are separately formed into a plate-like shape by a suitable preparatory press before they are introduced as a substitute for the alternate into the mold cavity, or a parting agent in the form of foil is prepared. More specifically, metallic powder is introduced in the mold cavity 1a to a prescribed depth in order to form the first metallic powder layer 31 as shown in FIG. 6A. Next, the first parting agent layer 71 in the form of a plate or foil is placed in position on the first metallic powder layer 31 while leaving a cylindrical space therearound as shown in FIG. 6B. The contours of the first and subsequent parting agent layers are smaller than that of the mold cavity 1a. After the first parting agent layer 71 is set in position, the metallic powder is again introduced in the mold cavity 1a to a prescribed depth in order to form the second metallic powder layer 32. Concurrently with this, the cylindrical space around the first parting agent layer 71 is filled with the metallic powder and a cylindrical metallic powder section 6a is formed as shown in FIG. 6C, which connects the first and second metallic powder layers 31 and 32 in one body with each other.

By repeating the above-described process, a green multilayer construction is obtained, which includes alternately superimposed metallic powder and parting agent layers and a cylindrical metallic layer made up of a number of continuous cylindrical metallic powder sections. Like the foregoing embodiment, this green multilayer construction is further subjected to the press, sintering and peripheral cutting in order to obtain the multilayer product.

Figure 7A:
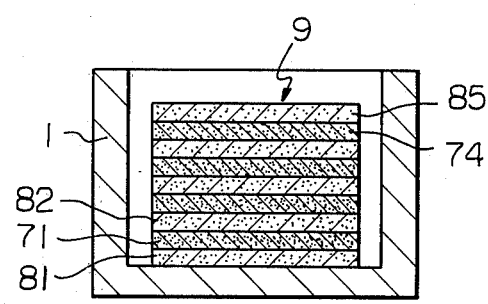
FIGS. 7A and 7B are side sectional views for showing subsequent steps of a further embodiment of the process in accordance with the present invention.
Figure 7B:
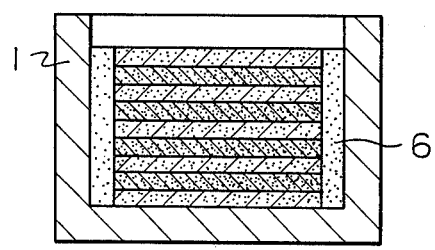

A further modified embodiment of the process in accordance with the present invention is shown in FIGS. 7A and 7B. In this case, a green multilayer construction 9 is separately formed by preparatory compaction. This green multilayer construction includes alternately superimposed metallic layers 81, 82 and so on and parting agent layers 71, 72 and so on. The contour of this construction 9 is smaller than that of the mold cavity 1a and the bottom of same is formed by the first metallic layer 81.

The construction 9 is first placed in position in the mold cavity 1a so that an annular space is left therearound as shown in FIG. 7A. Next, the metallic powder is introduced in the above-described cylindrical space as shown in FIG. 7B in order to form a cylindrical metallic powder layer around the construction 9. By application of subsequent press, sintering and peripheral cutting, a multilayer product can be obtained as in the foregoing embodiments.

In the case of the embodiments in which the sintered multilayer construction includes the cylindrical metallic layer 6 connecting the alternate superimposed metallic layers, the metallic material for the cylindrical metallic layer may be different in kind from that forming the superimposed metallic layers, as long as the former can be firmly bound to the latter by sintering. For example, a cylindrical iron layer may be combined with superimposed sendust alloy layers.

Press is applied to the green multilayer construction within the metallic mold 1 by means of a suitable press head. After the press by such a press head, the pressed multilayer construction may further go through known hydrostatic press. When the hydrostatic press is to be applied several times, it is advisable to apply annealing between successive hydrostatic presses.

The pressed multilayer construction is then subjected to heat treatment for sintering. Process conditions for this heating should be chosen so as to cause sintering of the metallic material or materials used for the green multilayer construction. For example, a sendust alloy is used for the metallic material, the heating temperature should preferably in a range from 900° to 1,350° C., and the heating time should preferably be in a range from 0.5 to 10 hours. As the environmental gas for heating, high vacuum air of $10^{-4}$ mm Hg. or lower, hydrogen gas having a dew point of $-40°$ C. or lower, or inert gas is advantageously usable.

The above-described sintering causes active mutual dispersion of metal particles within each metallic powder layer. In the case of the embodiment shown in FIGS. 2A to 2C, the presence of the intermediate parting agent powder layers hinders dispersion of the metal particles between the alternate metallic powder layers. In the case of the other foregoing embodiments, the presence of the cylindrical metallic powder sections 6a allows dispersion of the metal particles between the alternate metallic powder layers through the cylindrical metallic powder sections.

The thus obtained multilayer product is subjected to the peripheral cutting operation and separated into individual magnetic thin plates. Presence of the parting agent layers between the alternate metallic layers enables easy and troubleless separation of the metallic layers, i.e. the magnetic thin plates.

The unitary configuration of the pressed multilayer construction assures easy transportation and handling of it during the sintering process. Likewise, the unitary configuration of the sintered multilayer construction greatly simplifies transportation and handling of same during the cutting process.

In the case of the conventional process in which magnetic thin plates are formed by cutting them out of given cast materials, it was almost difficult to make their thickness smaller than 0.2 to 0.3 mm. In accordance with the process of the present invention, the thickness can be reduced to the order of 0.09 to 0.088 mm.

The number of metallic layers to be superimposed in a single multilayer product should be suitably chosen in accordance with requirements in practical production. However, when the thickness of each thin plate is made to less than 0.1 mm., it is advisable for a single multilayer product to contain four or more metallic layers.

The following example is illustrative of the present invention.

EXAMPLE

Fe-Al-Si alloy powder of $-325$ meshes was used for the metallic powder and $Al_2O_3$ powder of 0.05 $\mu$m particle size was used for the parting agent powder.

Figure 4B:
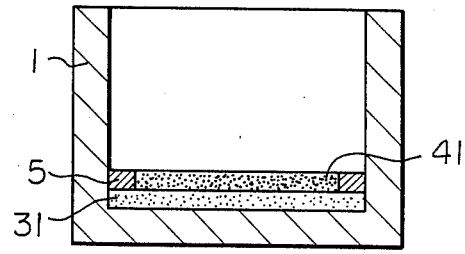
Figure 4C:
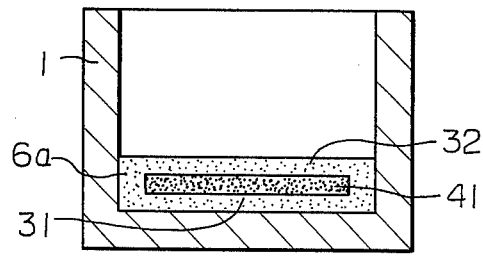

The powders were both alternately introduced in a metallic mould in a manner such as shown in FIGS. 4A to 4C. Press was applied to the green multilayer construction to such an extent that the thickness of each metallic powder layer after the press is equal to 0.1 mm. Sintering was carried out in hydrogen gas environment at 1,200° C. for 3 hours. The cylindrical metallic layer was completely removed by cutting and the multilayer product was separated into a number of thin plates. The thickness of the Fe-Al-Si alloy thin plates so obtained was in a range from 0.088 to 0.09 mm. The separation was carried out quite free of any trouble and the yield was appreciably high.

As a result of this test, it was confirmed that the process of the present invention enables easy production of extremely thin magnetic plates with appreciably high yield. In addition, time required for manufacturing can be greatly minimized. Thus, the process of the present invention is particularly suited for manufacturing of extremely thin magnetic plates for head cores from hard-to-work materials such as Fe-Al-Si type alloys which are in general very excellent in magnetic properties. Consequently, by combining a number of extremely thin plates thus formed in a superimposed state, it is possible to obtain a multilayer-type head core with considerably reduced eddy current loss.

We claim:

1. An improved method of manufacturing extremely thin magnetic plates for multilayer-type head cores, comprising the steps of:
   introducing alternate layers of a hard to work magnetic metallic material powder and a parting agent into a mold;
   compressing said layers of material powder and parting agent together in said mold under sufficient pressure to cause said material powder and said parting agent to form a unitary multilayer product having alternating layers of magnetic material powder and parting agent;
   sintering said unitary multilayer product; and thereafter
   separating said sintered multilayer product into a number of extremely thin magnetic plates defined by said sintered, compressed magnetic material powder layers.

2. An improved method as claimed in claim 1 further comprising the step of
   applying peripheral cutting to said sintered multilayer product as part of said separating step.

3. An improved method as claimed in claim 1 or 2 in which said parting agent is a powder and said step of introducing alternate layers comprises the steps of:
   introducing metallic powder in said mold in order to form one said metallic powder layer,
   introducing parting agent on said metallic powder layer in said mold cavity in order to form one said parting agent powder layer on said metallic powder layer, and
   repeating the above-described steps in order to form, in said mold cavity, a green multilayer construction which has alternately superimposed metallic powder and parting agent powder layers.

4. An improved method as claimed in claim 1 or 2 in which said parting agent is a powder and said step of introducing alternate layers comprises the steps of:
   introducing metallic powder in said mold in order to form one said metallic powder layer,
   locally covering the top surface of said metallic powder layer by a mask,
   introducing parting agent powder in the space around said mask to the top surface of said mask,
   removing said mask in order to form one said parting agent powder layer on said metallic powder layer,
   introducing said metallic powder on said parting agent powder layer and in a space previously occupied by said mask in order to form another said metallic powder layer, and
   repeating the above-described steps in order to form, in said mold, a multilayer construction which has alternately superimposed metallic powder and parting agent powder layers, and a cylindrical metallic powder layer embracing the superimposed mass.

5. An improved method as claimed in claim 1 or 2 in which said step of introducing alternate layers comprises the steps of:
   introducing metallic powder to a prescribed depth in said mold in order to form one said metallic powder layer;
   placing a parting agent layer in position on said metallic powder layer, said parting agent layer being prepared by preparatory compaction and being smaller in contour than said mold;
   introducing said metallic powder on said parting agent layer and in a space on a portion of the top of said one metallic powder layer not occupied by said parting agent layer to form another said metallic powder layer; and
   repeating the above-described steps to form, in said mold, a multilayer construction which has alternatly superimposed metallic powder and parting agent layers and a cylindrical metallic powder layer surrounding them.

6. An improved method as claimed in claim 1 or 2 in which said step of introducing alternate layers comprises the steps of:
   placing a multilayer block in position in said mold, which multilayer block includes alternately superimposed metallic and parting agent layers, is prepared by preparatory compaction, and is smaller in contour than said mold, and
   introducing metallic powder in a space left around said multilayer block in said mold to form, in said mold, a multilayer construction which has alternately superimposed metallic and parting layers and a cylindrical metallic powder layer surrounding them.

7. An improved method as claimed in claim 6, wherein said parting agent is a foil with surface oxidation.

8. An improved method as claimed in claim 1 or 2, wherein said separating step includes cutting each said parting agent layer which is disposed between two adjacent said magnetic metallic material layers.

9. An improved method as claimed in claim 1 or 2, wherein each said magnetic thin plate has a thickness of approximately 0.09 mm.

10. An improved method as claimed in claim 1 or 2, wherein said parting agent is a material that does not disperse into said magnetic metallic material at the temperature at which sintering step is performed.

11. An improved method of manufacturing extremely thin magnetic plates for multilayer-type head cores, comprising the steps of:
    introducing alternate layers of a hard to work magnetic metallic material powder and a parting agent into a mold, said material powder being an sendust alloy;
    compressing said layers of said material powder and parting together in said mold under sufficient pressure to cause said material powder and said parting agent to form a unitary multilayer product having alternating layers of magnetic material powder and a parting agent;
    sintering said unitary multilayer product; and thereafter
    separating said sintered multilayer product into a number of extremely thin magnetic plates defined by said sintered, compressed magnetic material powder layers.

12. An improved method of manufacturing extremely thin magnetic plates for multilayer-type head cores, comprising the steps of:
    introducing alternate layers of a hard to work magnetic metallic material powder and a parting agent into a mold, said material powder being an alperm alloy;
    compressing said layers of material powder and parting agent together in said mold under sufficient pressure to cause said material powder and said parting agent to form a unitary multilayer product having alternating layers of magnetic material powder and parting agent;

sintering said unitary multilayer product; and thereafter separating said sintered multilayer product into a number of extremely thin magnetic plates defined by said sintered, compressed magnetic material powder layers.

13. An improved method of manufacturing extremely thin magnetic plates for multilayer-type head cores, comprising the steps of:

introducing alternate layers of a hard to work magnetic metallic material powder and a parting agent into a mold, said parting agent being a foil with surface oxidation;

compressing said layers of material powder and parting agent together in said mold under sufficient pressure to cause said material powder and said parting agent to form a unitary multilayer product having alternating layers of magnetic material powder and parting agent;

sintering said unitary multilayer product; and thereafter separating said sintered multilayer product into a number of extremely thin magnetic plates defined by said sintered, compressed magnetic material powder layers.

14. An improved method as claimed in claim 11, further comprising the step of applying peripheral cutting to said sintered multilayer product as part of said separating step.

15. An improved method of manufacturing extremely thin magnetic plates for multilayer-type head cores, comprising the steps of:

introducing alternate layers of a hard to work magnetic metallic material powder and a parting agent into a mold, said parting agent comprising alumina powder;

compressing said layers of material powder and parting agent together in said mold under sufficient pressure to cause said material powder and said parting agent to form a unitary multilayer product having alternating layers of magnetic material powder and parting agent;

sintering said unitary multilayer product; and thereafter separating said sintered multilayer product into a number of extremely thin magnetic plates defined by said sintered, compressed magnetic material powder layers.

16. An improved method as claimed in claim 15, wherein said separating step includes the step of applying peripheral cutting to said sintered multilayered product.

17. An improved method of manufacturing extremely thin magnetic plates for multilayer-type head cores, comprising the steps of:

introducing alternate layers of a hard to work magnetic metallic material powder and a parting agent into a mold, said parting agent comprising magnesia powder;

compressing said layers of material powder and parting agent together in said mold under sufficient pressure to cause said material powder and said parting agent to form a unitary multilayer product having alternating layers of magnetic material powder and parting agent;

sintering said unitary multilayer product; and thereafter separating said sintered multilayer product into a number of extremely thin magnetic plates defined by said sintered, compressed magnetic material powder layers.

18. An improved method as claimed in claim 17, wherein said separating step includes the step of applying peripheral cutting to said sintered multilayered product.

19. An improved method of manufacturing extremely thin magnetic plates for multilayer-type head cores, comprising the steps of:

introducing alternate layers of a hard to work magnetic metallic material powder and a parting agent into a mold, said parting agent comprising silica glass powder;

compressing said layers of material powder and parting agent together in said mold under sufficient pressure to cause said material powder and said parting agent to form a unitary multilayer product having alternating layers of magnetic material powder and parting agent;

sintering said unitary multilayer product; and thereafter separating said sintered multilayer product into a number of extremely thin magnetic plates defined by said sintered, compressed magnetic material powder layers.

20. An improved method as claimed in claim 19, wherein said separating step includes the step of applying peripheral cutting to said sintered multilayered product.

* * * * *